(12) United States Patent
Skygebjerg

(10) Patent No.: US 7,104,457 B2
(45) Date of Patent: Sep. 12, 2006

(54) CARD READER AND A METHOD FOR READING OF CARDS

(75) Inventor: Per Skygebjerg, Göteborg (SE)

(73) Assignee: TDS Todos Data System AB, (SE)

(*) Notice: Subject to any disclaimer, the term of this patent is extended or adjusted under 35 U.S.C. 154(b) by 0 days.

(21) Appl. No.: 10/482,288

(22) PCT Filed: Jun. 26, 2002

(86) PCT No.: PCT/SE02/01258

§ 371 (c)(1),
(2), (4) Date: Dec. 30, 2003

(87) PCT Pub. No.: WO03/005285

PCT Pub. Date: Jan. 16, 2003

(65) Prior Publication Data

US 2004/0169079 A1 Sep. 2, 2004

(30) Foreign Application Priority Data

Jul. 2, 2001 (SE) .................................. 0102361

(51) Int. Cl.
*G06K 7/00* (2006.01)
(52) U.S. Cl. ............... 235/486; 235/492; 235/375
(58) Field of Classification Search ............... 235/375, 235/380, 381, 383, 385, 486, 492; 345/168, 345/169; 379/433.01, 433.09
See application file for complete search history.

(56) References Cited

U.S. PATENT DOCUMENTS

| | | | |
|---|---|---|---|
| 5,444,192 A * | 8/1995 | Shetye et al. ............ 178/18.09 |
| 5,563,631 A * | 10/1996 | Masunaga .................... 345/169 |
| 5,787,406 A | 7/1998 | Arsenault et al. |
| 5,825,353 A * | 10/1998 | Will ............................ 345/184 |
| 5,835,732 A * | 11/1998 | Kikinis et al. .............. 710/303 |
| 5,915,016 A * | 6/1999 | Savalle et al. ......... 379/433.09 |
| 5,915,228 A * | 6/1999 | Kunihiro et al. ......... 455/575.1 |
| 5,931,873 A * | 8/1999 | Cisar ............................. 701/1 |
| 6,118,986 A * | 9/2000 | Harris et al. ............. 455/575.3 |
| 6,226,534 B1 * | 5/2001 | Aizawa ..................... 455/566 |
| 6,254,001 B1 * | 7/2001 | Chan ......................... 235/380 |
| 6,297,795 B1 * | 10/2001 | Kato et al. ................. 345/684 |
| 6,496,181 B1 * | 12/2002 | Bomer et al. .............. 345/167 |
| 6,625,446 B1 * | 9/2003 | Mochizuki ................ 455/421 |
| 6,729,550 B1 * | 5/2004 | Seita et al. ................ 235/492 |

(Continued)

FOREIGN PATENT DOCUMENTS

DE 19703535 8/1998

(Continued)

OTHER PUBLICATIONS

English language translation of Chinese Patent Office Action dated Apr. 8, 2005 for Chinese Appl. No. 02813278.5.

*Primary Examiner*—Ahshik Kim
(74) *Attorney, Agent, or Firm*—Harness, Dickey & Pierce

(57) ABSTRACT

The present invention relates to a portable card reader for communication with card provided with a chip, such as so called smart cards. The reader comprises processing means, a card holder for holding the card in contact with connection means to form a connection between said chip and said processing means, a display and entering means for manually entering information into the reader. The entering means comprises a roller for scrolling a predetermined set of input items, simultaneously being displayed on the display, and an entry key for selecting a presently chosen one of said input item.

20 Claims, 3 Drawing Sheets

U.S. PATENT DOCUMENTS 6,816,154 B1 * 11/2004 Wong et al. ................. 345/175
6,824,048 B1 * 11/2004 Itabashi et al. ............. 235/380

FOREIGN PATENT DOCUMENTS

| EP | 1004980 | 5/2000 |
|----|---------|--------|
| EP | 1132933 | 9/2001 |
| FR | 2797700 | 2/2001 |
| JP | 10-91744 | 4/1998 |
| JP | 2000-20470 | 8/2001 |

* cited by examiner

CARD READER AND A METHOD FOR READING OF CARDS

FIELD OF THE INVENTION

The present invention relates to a portable card reader for interaction with card provided with a chip, comprising processing means, a card holder for holding the card in contact with connection means to form a connection between said chip and said processing means, a display and entering means for manually entering information into the reader. The invention further relates to a method for interaction with such cards.

BACKGROUND OF THE INVENTION

The need for secure electronic transactions involving a user and a transaction system such as an Internet based shopping site or an automatic teller machine (ATM) at a bank, has increased dramatically during recent years. A major question relating to secure transactions is that of authentication of the user to the system. That is, how to identify a user as being the owner of, e.g., a bank account from which the user is to withdraw money from when using an ATM.

A well-established method of authenticating users in such systems is that of providing the user with an electronically readable device containing information about the user and his account. Such cards are common and contain magnetically stored information. In order to allow the user to use his card in an ATM, the issuer (e.g. the bank) has provided the user with a secret code to be supplied to the ATM when using the card. The code is used to "unlock" the card for use by the user every time the user makes use of his card.

However, a drawback of such a method is that one and the same code is used every time a user authenticates with a system. This increases the risk of unauthorized use of the card if the user loses the card.

To this end, portable code-generating devices has been developed, in which a new code is generated each time it is used, based on personalizing information provided by the user, such as a personal PIN-code. Such devices are generally of two types. A first type is specifically developed gadgets with entering means such as a keyboard, a display, a processor for generating the code, etc. However, the problems with such devices are that they are complicated and expensive to manufacture. A second type relates to so called smart cards or integrated circuit card (ICC), i.e. cards provided with a chip. Such cards are preferably in the size of a credit card, and comprising a plastic substrate and an integrated chip with an electric interface surface arranged on one side of the card. However, in order to access the information and/or services on the card, a card reader is needed, and such devices has hitherto been expensive, complicated to use and/or big and difficult to bring along. Accordingly, there is a need for a truly portable card reader, which is simple and inexpensive to manufacture, and easy and convenient to use.

Cards of the above-mentioned type have many further possible applications in which similar problems and drawbacks regarding the accessing means are present.

SUMMARY OF THE INVENTION

It is therefore an object of the present invention to provide a portable card reader and a method for accessing information and/or services on a card provided with a chip whereby the above-discussed problems are alleviated.

This object is achieved with a card reader and a method according to the appended claims.

According to the invention, a portable card reader for communication with card provided with a chip is provided, said reader comprising processing means, a card holder for holding the card in contact with connection means to form a connection between said chip and said processing means, a display and entering means for manually entering information into the reader, wherein said entering means comprises a roller for scrolling a predetermined set of input items, simultaneously being displayed on the display, and an entry key for selecting a presently chosen one of said input items.

The reader according to the invention could be made very small and still provide efficient and convenient entry of e.g. alphanumerical characters. The card reader according to the invention could be made so small that it could be carried on an ordinary key-ring in a pocket, and thus be always accessible for the user.

The predetermined set of input values preferably comprises alpha numerical characters, preferably to be used as personalizing information for accessing information and/or services on the card. Hereby, the card reader in combination with a smart card could be used to provide one-time codes for access of internet banking services and other internet applications, ATM services, telephone services and the like.

The predetermined set of input items could also comprise at least one control character, such as "delete", "back space", "accept input/OK" or "return to a higher menu level". Hereby, the options for the user to correct mistakes, undo entries and choices, etc, are increased without having to add further keys or other types of additional entry means.

According to a preferred embodiment, at least two sets of input items is further provided, wherein entry of at least one input item or sequence of input items from a first set of input items enables entry of input items from a second set of input items. In this case, the first set could comprise a menu of different alternative uses of the reader, such as access to codes for different services. When one use is chosen, a next set of input items could be used for entry of personalized information, such as a PIN-code. The sets of predetermined input items could be provided by the processing means in the reader, but one or several of the predetermined sets may also be provided by the card.

Preferably, the card reader is further of an elongate form, preferably with a length less than 50% longer than the width of the card to be read. This makes the reader very small and easy to be carried around.

It is further preferred that the reader is provided with an energy supply, and preferably a battery. Hereby, the reader becomes a self-sufficient, stand-alone device, which could be used anywhere and at all times.

The card holder preferably comprises a card slot formed in the reader in which the card could be at least partly inserted. Hereby, insertion and extraction of the cards becomes very easy and convenient. Further, the card is reliably held in place during use.

The invention further relates to a corresponding method for accessing services and/or information on a card provided with a chip, comprising the steps of:

arranging at least part of the card in contact with a reader to form a connection between said chip and said reader;

entering information into the reader to be conveyed to the card, wherein the entering scrolling a predetermined set of input items, said items simultaneously being shown on a display device on the reader, and accepting input items to be chosen;

transferring information from the card to the reader in correspondence with the entered information.

BRIEF DESCRIPTION OF THE DRAWINGS

For exemplifying purposes, the invention will be described in closer detail in the following with reference to embodiments thereof illustrated in the attached drawings, wherein:

FIG. 1b is a perspective view from below of the card reader in FIG. 1a;

DESCRIPTION OF PREFERRED EMBODIMENTS

Figure 1A:
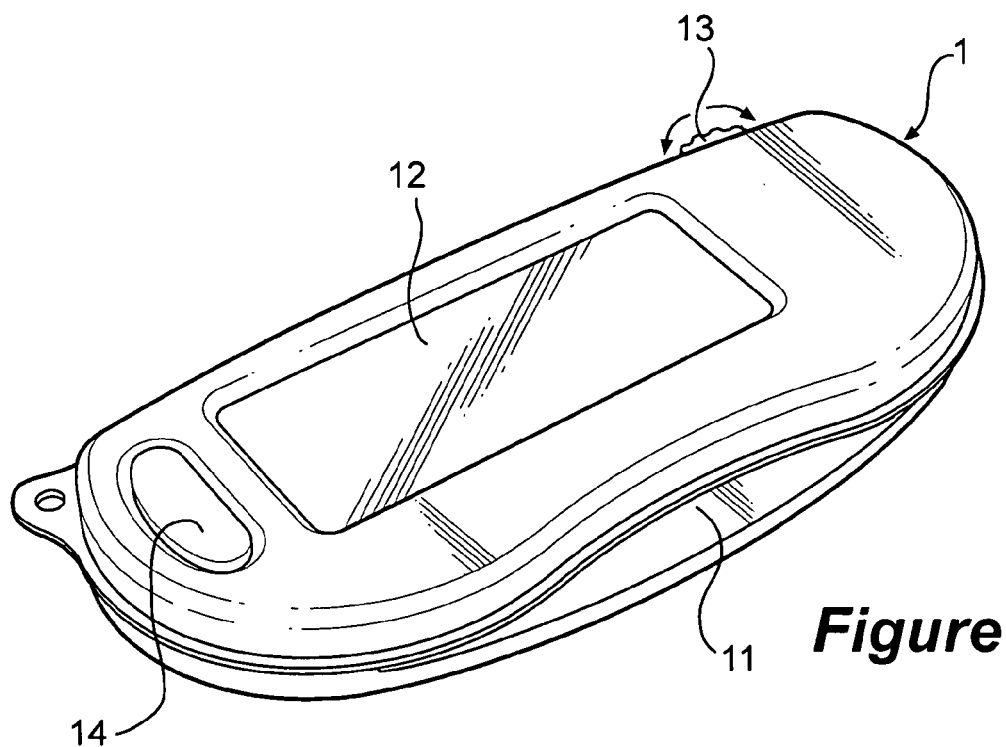
FIG. 1a is a perspective view from above of a card reader according to an embodiment of the invention.
Figure 1B:
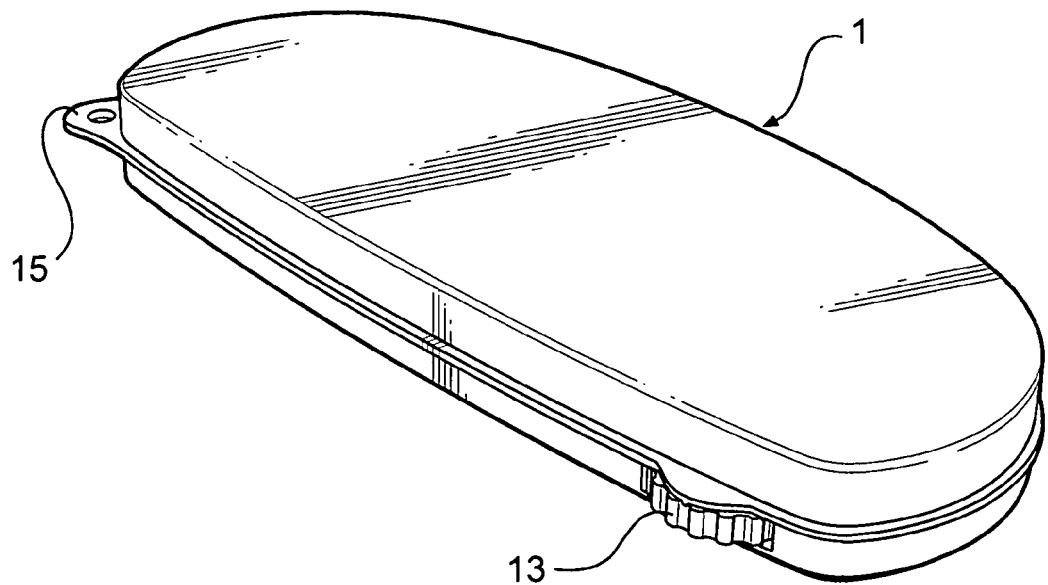

In FIGS. 1a and 1b a portable card reader according to an embodiment of the invention is illustrated. The card reader 1 comprises a card-holder in the form of a card slot 11 for receiving a card to be read. The card could be any card provided with hardware processing means, i.e. a chip. The cards could e.g. be so called smart cards or integrated circuit cards (ICC).

The card reader comprises a display 12, such as an LCD display, and entering means. The entering means comprises a roller 13 for scrolling a predetermined set of input items, simultaneously being displayed on the display 12, and an entry key 14 for selecting a presently chosen one of said input items.

Figure 2:
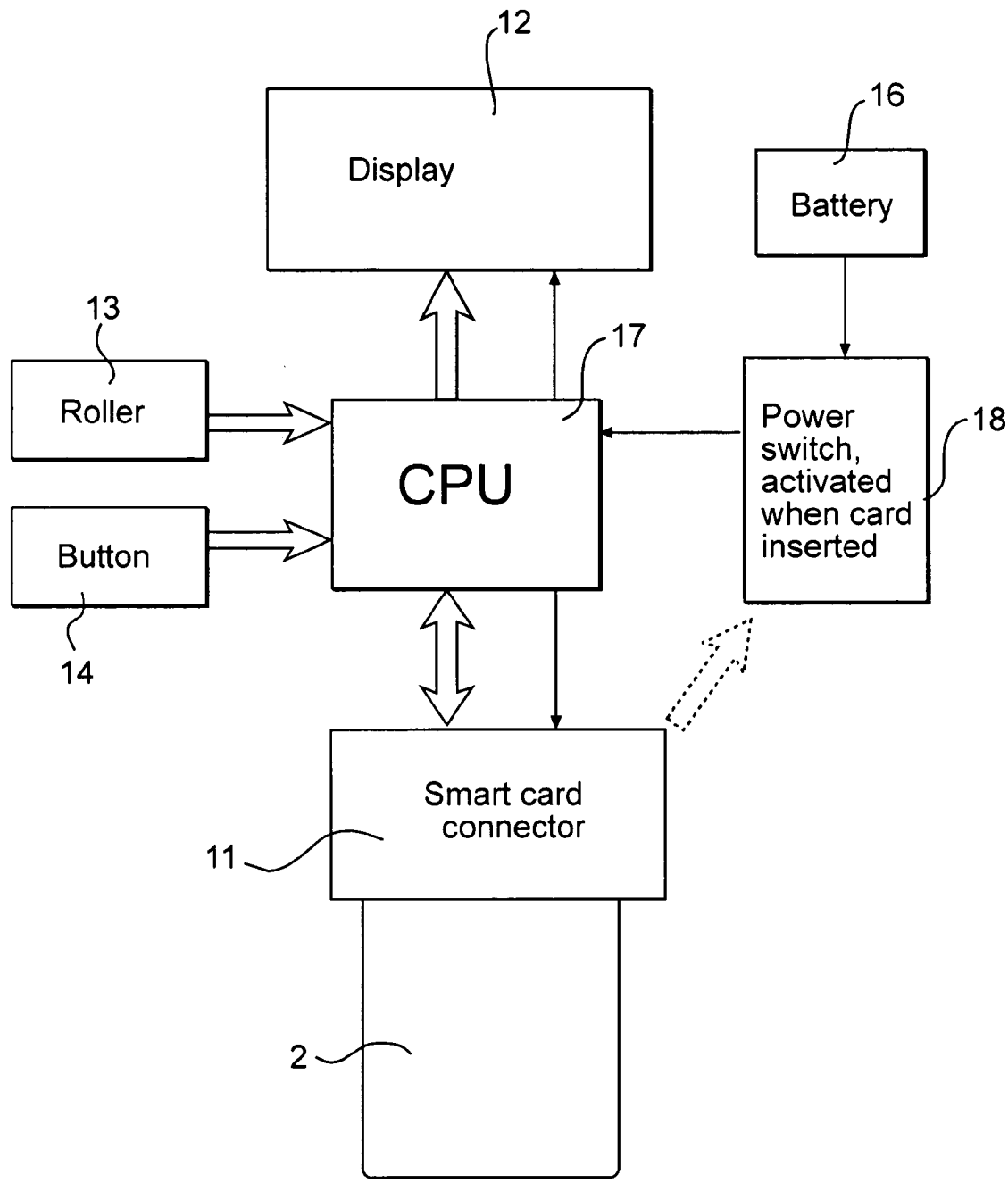
FIG. 2 is a schematic block diagram of a card reader according to an embodiment of the invention.

As is illustrated in schematically in FIG. 2, the card reader further comprises processing means 17, and an energy supply 16, such as a battery, to make the reader self-sufficient. The processing means could be a conventional processor, such as a commercially available CPU. The processor 17 receives input from the entering means 13, 14 and from the card 2 through connection means arranged in the cardholder 11. The output from the processor is sent to the display 12 and/or the card 2. The power from the energy supply 16 is preferably transferred to the processor 17, and conveyed to other components requiring energy for their operation, such as the display and the card chip. In order to limit the power consumption, a switch 18 is preferably arranged between the battery and the processor. The switch could be manually operated, but preferably it is automatically switched on when a card is inserted into the card holder.

In use, the card is inserted into the card slot of the reader, and a message is presented to the user on the display. Preferably the user is first presented with one or several input items in a first predetermined set of input items. The input items could e.g. be a string of characters indicating one of several different applications for which the reader could be used, such as: "code", "cash" and "bank". However, further options may also be available, such as "internet bank", "ATM", "telephone bank", "authorization", "signature", etc. Some possible applications are discussed in more detail in the following. The predetermined set of input items could be stored either in the reader or in the card. When the user turns the roller the input items are scrolled, and are simultaneously displayed on the display. Preferably, only the presently chosen input item is presented in the display. However, several input items may be presented simultaneously, whereby the presently chosen item could be illustrated by being high-lighted, underlined or the like. By pressing the button or key 14, the presently chosen item is selected and sent back to the processing means, and the information could also be transferred to the card.

Thereafter, a second set of predetermined input items may be accessed, depending on the application, for entering an alphanumerical code, such as a PIN-code, or the like.

In case an alphanumerical code should be entered, all the possible input values are preferably presented in a row on the display, whereby different items are sequentially high-lighted or marked by turning the roller. A possible string for code entry could be: "1", "2", "3", "4", "5", "6", "7", "8", "9" and "0". As items are selected, the selected items are preferably presented in a separate part of the display, such as above the row of possible input items, and preferably in the order they are being selected.

The input string may further comprise control items, such as "back space", "delete", "return to higher level", "proceed to next step/OK", and the like.

The card reader could preferably have an elongate form, with a length only slightly longer than the width of the card to be read, and preferably not more than 50 longer than said width. A reader for a card of credit card size, the reader could typically be of the dimensions 67 mm×28 mm×11 mm. The weight is preferably less than 50 g, and typically 25–30 g.

The card could be adapted to identify a correctly entered PIN-code or the like, and to generate a one-time code, a key or the like to be used for a certain application and transfer it to the reader. The key/code could be in the form of a four-digit number, but any number of digits or other character could be used as well.

In case a code for bank access should be generated, a PIN code is first entered by scrolling through the numbers and pressing the button for OK. The choice could be between the string: "back 1 2 3 4 5 6 7 8 9 0 OK" The PIN-code is used to unlock the card. If accidentally the wrong number is selected, the user just scrolls to "back" and press the button to erase it. After a correct entry a newly generated OTC is presented on the display.

In case a digital signature or the like should be generated, the user enters values to sign. The values could be received via the PC or telephone from the service provider. A signing key is then generated by the card and is presented in the display.

When the card functions as a cash card, a so called e-purse, a PIN-code or the like may be used to access the information on the card. Thereafter, scrolling could e.g. provide the following information, to be displayed on the reader:

Balance on the card.

The latest transactions.

For the generation of codes, keys and the like, several algorithms are known and available, such as DES and RSA. Any suitable algorithm could be used within the context of the present invention.

Figure 3:
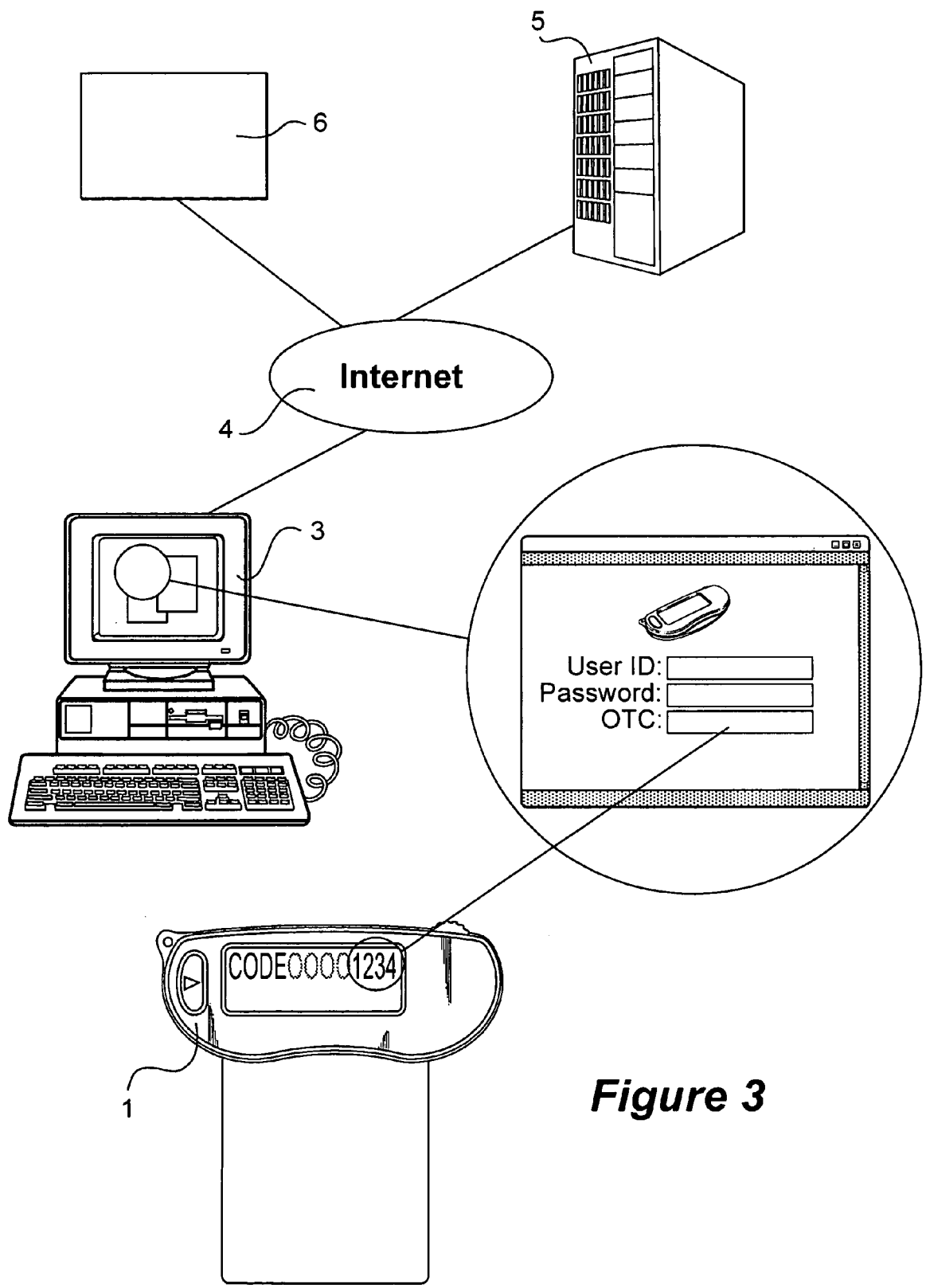
FIG. 3 is a schematic system overview of a system in which the card reader according to the invention could be used.

The card reader according to the invention could be used in a network, as is schematically illustrated in FIG. 3. The user uses the card 2 and the card reader 1 to access one-time codes (OTC) and the like. The code is entered into a terminal device 3, such as a personal computer, a mobile phone, a stationary telephone, a personal digital assistant, or the like. The terminal device is connected to a network 4, such as the public telephone network, a wireless network, a computer network, e.g. a LAN or a WAN, such as the Internet. However, as is appreciated by someone skilled in the art, several other types of networks and terminals may be used. The code is transferred through the network, and used in one or several applications 5, 6, as is discussed in more detail in the following.

Some possible applications in which the card reader system discussed above could be used will now be discussed. However, it should be appreciated that many other applications are possible as well.

The card reader system could be used for user authentication. This is a process whereby the users identity is established in a secure way. Traditional user authentication, or secure identification, is basically a process whereby the user proves the knowledge or possession of a secret. The exception is biometric methods. It might be a Personal Identification Number, PIN for a particular debit card or a password or a combination of those. These secrets are often static and may impose a risk of eavesdropping. If the secret can be used only once then increased security is achieved. It is however important that those one-time secrets or codes do not fall into the wrong hands. This poses a requirement on how the codes are kept by the user. However, with the card and the card reader as discussed above, new one-time codes could be generated whenever they are needed.

The inventive system could also be used for non-repudiation. This security service is achieved with the digital signature mechanism. In short, the originator uses his/her private key to encrypt the message or transaction. If this is a long message then a substitute of the message is used instead. The substitute is a message digest often called hash, if the message calculated with a non secret hash algorithm without any keys over the message. The recipient uses the corresponding public key to decrypt the hash. If the two hashes match then only the holder if the private key could have sent the message and non repudiation of origin is achieved.

The e-code algorithm could be based implemented on a smart card, and the algorithm could calculated the value based on an identifier, the e-code id, and a sequence number, a number of a decimal One Time Code (OTC). This OTC could be a set of 4–12 digits depending on parameter settings. For every OTC generated the sequence number is incremented and updated within the smart card.

The inventive system could further be used in data integrity applications. This security service enables a recipient of data to establish whether the receiver data has been modified or not after having been sent by the originator. This service is based on a non secret algorithm and mechanism which computes a File Verification Value, FVV, based on the message and a secret key. The recipient of the message performs a similar process and computes a second FVV based on the received data and the agreed key. If the FVV computed by the recipient and the FVV received are identical then the message has not been modified. With the inventive card system, the key management could be greatly simplified.

Still further, the invention could be useful for data confidentiality applications. This security service makes a message or transaction or a piece of data unintelligible to someone trying to read it. The mechanism for data confidentiality is encryption. The originator of a message runs the message through an encryption process prior to sending it. The encryption algorithm works with a key and produces ciphertext output from cleartext input. The recipient runs the received ciphertext through the same algorithm in decipher mode with the decryption key to recover the cleartext. When the originator/sender and recipient have the same secret key the encryption is said to be symmetric. When the originator has a different non secret key specially related to the receivers' key, which is secret, the encryption is asymmetric. When asymmetric encryption is used the receivers' secret key is called private and the originators key is called public. The two keys are generated in a special process and are specially related, often called private-public key pair. The private key could be stored within a smartcard where it can only be accessed after a correct PIN-entry with the card reader as discussed above.

The inventive card reader and method for reading cards could provide a convenient and cost effective solution for accessing card information. The card reader is a small and portable stand-alone device, which is not exposed to virus attacks. The reader is also simple and inexpensive to produce, and could be used for essentially all types of cards provided with a chip. Accordingly, the card reader could be sold in general stores, newsstands, gas stations, and the like. Further, the card reader could be used for many different applications, such as for code generation, access to banking services, to manage cash cards, e-purses, and the like. Such services could be arranged on different cards, or several services could be combined on a common card. The reader need further not be exchanged together with the card, but the same reader could be used for interaction with different cards. And the generality of the reader is further increased due to the fact that much of the functionality may be controlled by the chip on the card, such as the information to be presented to the user, the options that could be chosen, etc.

The invention claimed is:

1. A portable card reader for accessing access code from a card provided with a chip, comprising:
   a processor;
   a card holder for holding the card in contact with a connector to form a connection between the chip and said processor, wherein the card is a smart card or integrated circuit card;
   a display; and
   entering means for manually entering alphanumerical characters into the reader, wherein said entering means includes a roller for scrolling a predetermined set of input items, simultaneously being displayed on the display, and an entry key for selecting a presently chosen one of the input items, said portable card reader having an elongated form, with a length less than 50% longer than the width of the card to be read, and wherein said entered alphanumerical characters are useable in said card for accessing an access code, whereby said access code is presentable on the display.

2. A card reader according to claim 1, wherein the predetermined set of input values includes alpha numerical characters.

3. A card reader according to claim 1, wherein the predetermined set of input items includes at least one control character.

4. A card reader according to claim 1, further comprising:
   at least two sets of input items, wherein entry of at least one input item from a first set of input items enables entry of a second set of input items.

5. A card reader according to claim 1, wherein the processor is adapted to display information, provided by the card, on the display.

6. A card reader according to claim 1, further comprising:
   an energy supply.

7. A card reader according to claim 1, wherein the card holder includes a card slot formed in the reader, in which the card is at least partly insertable.

8. A card reader for retaining access codes from a smart card, according to claim 1.

9. A card reader according to claim 1, wherein the predetermined set of input values includes alpha numerical characters usable as personalizing information for accessing at least one of information and services on the card.

10. A card reader according to claim 1, wherein the predetermined set of input items includes at least one control character including at least one of "delete", "back space", "accept input/OK" and "return to a higher menu level".

11. A card reader according to claim 1, further comprising:
a battery.

12. A portable card reader for accessing access codes from a card provided with a chip, comprising:
means for forming a connection between the chip of a smart card or integrated circuit card and a processor; and
means for entering alphanumerical characters into the portable card reader, wherein said means for entering includes means for scrolling through a plurality of input items, simultaneously being displayed, and means for selecting a chosen one of the input items, said portable card reader having an elongated form, with a length less than 50% longer than the width of the card to be read, and wherein said entered alphanumerical characters are useable in said card for accessing an access code, whereby said access code is displayed.

13. A card reader according to claim 12, wherein the plurality of input values includes alpha numerical characters.

14. A card reader according to claim 12, wherein the plurality of input items includes at least one control character.

15. A card reader according to claim 12, wherein the plurality of input items includes at least two sets of input items, wherein entry of at least one input item from a first set of input items enables entry of at least one input item from a second set of input items.

16. A card reader according to claim 12, further comprising:
an energy supply.

17. A card reader according to claim 12, wherein the means for forming a connection includes a card slot formed in the card reader, in which the card is at least partly insertable.

18. A card reader for retaining access codes from a smart card, according to claim 12.

19. A card reader according to claim 1, wherein the card reader weighs less than 50 grams.

20. A card reader according to claim 12, wherein the card reader weighs less than 50 grams.

* * * * *